US007719928B2

(12) United States Patent
Meltzer et al.

(10) Patent No.: US 7,719,928 B2
(45) Date of Patent: May 18, 2010

(54) RADIO WATCH

(75) Inventors: David Meltzer, Wappinger Falls, NY (US); Gregory Blum, Lagrangeville, NY (US)

(73) Assignee: Seiko Epson Corporation, Tokyo (JP)

( * ) Notice: Subject to any disclaimer, the term of this patent is extended or adjusted under 35 U.S.C. 154(b) by 554 days.

(21) Appl. No.: 11/423,101

(22) Filed: Jun. 8, 2006

(65) Prior Publication Data

US 2007/0286028 A1 Dec. 13, 2007

(51) Int. Cl.
*G04C 11/02* (2006.01)
*H04B 1/18* (2006.01)

(52) U.S. Cl. ..................................... 368/47; 455/183.1

(58) Field of Classification Search .................. 368/46, 368/47

See application file for complete search history.

(56) References Cited

U.S. PATENT DOCUMENTS 4,268,915 A * 5/1981 Parmet .................... 455/158.4
4,315,332 A * 2/1982 Sakami et al. ........... 455/181.1
4,582,434 A * 4/1986 Plangger et al. ............... 368/46
4,768,178 A * 8/1988 Conklin et al. ................ 368/47
4,823,328 A * 4/1989 Conklin et al. ................ 368/47
4,903,336 A * 2/1990 Masuhara et al. ........... 455/344
5,068,838 A * 11/1991 Klausner et al. .............. 368/47
5,089,814 A * 2/1992 DeLuca et al. ......... 340/825.49
5,537,101 A 7/1996 Nakajima et al.
5,877,656 A 3/1999 Mann et al.
5,930,697 A 7/1999 Bohme et al.
5,952,890 A * 9/1999 Fallisgaard et al. ........... 331/18
6,014,349 A * 1/2000 Iwasaki et al. ........... 369/47.28
6,452,909 B1 * 9/2002 Bauer ......................... 370/280
6,744,839 B1 * 6/2004 Tada et al. .................. 375/376
7,209,495 B2 * 4/2007 Partyka ...................... 370/527
2003/0119461 A1 * 6/2003 Hirano et al. ............... 455/118
2005/0094495 A1 * 5/2005 Takada et al. ................. 368/47
2005/0122952 A1 6/2005 Haefner et al.
2006/0023572 A1 * 2/2006 Someya ....................... 368/47

OTHER PUBLICATIONS

Lombardi, Michael A., "Radio Controlled Clocks", National Institute of Standards and Technology (NIST), Time and Frequency Division, 2003 NCSL International Workshop and Symposium, pp. 1-18.

* cited by examiner

*Primary Examiner*—Vit W Miska

(57) ABSTRACT

Apparatuses, circuits, and methods for receiving at least one radio signal in a radio controlled timing apparatus using a single timing source. The present invention advantageously eliminates the need to provide an additional timing source to receive at least one radio signal, and therefore reduces the material cost and eliminates many engineering challenges.

7 Claims, 5 Drawing Sheets

BACKGROUND ART

BACKGROUND ART

RADIO WATCH

FIELD OF THE INVENTION

The present invention generally relates to the field of radio controlled clocks. More specifically, embodiments of the present invention pertain to apparatuses, circuits, and methods for receiving at least one radio signal in a radio controlled clock using a single reference timing source.

DISCUSSION OF THE BACKGROUND

A radio controlled clock is a timepiece capable of adjusting its time by receiving and decoding a special time code signal. The time code signal is encoded with the current time and date and may also contain a daylight savings time and/or leap year indicator. The time code signal may also contain parity bits for ensuring accurate reception. Typically, this time code signal modulates a low frequency carrier signal which is transmitted by a government-established radio station. Several governments throughout the world have established one or more radio stations to broadcast such time code signals, including: the United States' WWVB broadcasting at 60 kHz; the United Kingdom's MSF broadcasting at 60 kHz; Germany's DCF77 broadcasting at 77.5 kHz; Japan's JJY broadcasting at both 40 kHz (transmitting in the Fukushima prefecture) and 60 kHz (transmitting on the border of the Saga prefecture and the Fukoka prefecture); China's BPC broadcasting at 68.5 kHz; Switzerland's HGB broadcasting at 75 kHz; and eastern Russia's RTZ broadcasting at 50 kHz. Additionally, some transmitters in the LORAN-C navigation system (which broadcast at 100 kHz) transmit time code signals which are synchronized to Coordinated Universal Time (UTC). Each of these radio stations modulates the carrier in substantially the same manner: reduced carrier pulse width modulation. However, since different radio stations generally broadcast time code signals on different frequencies, a radio controlled clock marketed for operation in more than one location and/or country needs to be designed to receive time code signals on multiple frequencies.

Broadcast time code signals are generated by modulating a carrier signal with a time code signal. Generally, the modulation is accomplished by the following: a carrier signal is locked to a precise oscillator (such as a cesium oscillator); a 60-bit time code containing at least the current time and date is generated with reference to a national time source (such as UTC); and the carrier power is dropped and restored at predetermined times, depending on the modulated value of a specific time code bit.

Many radio controlled clocks contain one quartz crystal for time keeping purposes and at least one additional quartz crystal for demodulating the broadcast time code signal. The quartz crystal used for time keeping purposes is frequently divided to create a one pulse per second signal which drives a display mechanism. The frequency of the quartz crystal used for demodulating the broadcast time code signal correlates to the frequency of the particular radio station to be received.

FIG. 1 shows an example of a conventional radio controlled clock marketed for operation in a single location and/or country. A first quartz crystal 11 is coupled with an oscillator circuit 12 to provide a reference timing signal 13. Typically, this first quartz crystal 11 has a resonance frequency of 32768 Hz. The oscillator circuit 12 is further coupled to a frequency divider 20 which generates a real-time signal 21. The real-time signal 21 is used to drive a timing mechanism 30, and typically, has a frequency of one pulse per second. A low frequency broadcast time code signal 41 is received by an antenna 42 and amplified by an RF amplifier 43 to generate a modulated time code signal 44. The RF amplifier 43 is coupled to a second quartz crystal 51 to produce a time code signal 55. The resonance frequency of the second quartz crystal 51 is determined by the location and/or country in which the radio controlled clock is specified to operate. For example, a unit marketed for operation in the United States may have a second quartz crystal 51 with a resonance frequency of 60 kHz. The time code signal 55 is received by a radio receiver/time code decoder 60 which generates a time setting and/or correction signal 61. The timing mechanism 30, by receiving the time setting and/or correction signal 61, may therefore be synchronized with the broadcast time code signal 41.

More recent radio controlled clocks are marketed for operation in multiple locations and/or countries and therefore are able to receive multiple broadcast time code signals on different frequencies. FIG. 2 shows an example of how conventional multi-channel radio controlled clocks may differ from conventional single-channel radio controlled clocks. A low frequency broadcast time code signal 141 is received by an antenna 142 and amplified by an RF amplifier 143 which generates a modulated time code signal 144. A quartz crystal matrix 150 receives the modulated time code signal 144. The quartz crystal matrix may include quartz crystals 151, 152, 153 to convert the modulated time code signal 144 into the time code signal 155. For example, a radio controlled clock marketed for operation in the United States, Japan, and Germany may have one each of quartz crystals with resonance frequencies of 60 kHz, 40 kHz, and 77.5 kHz. The switching matrix 154 determines which of the plurality of quartz crystals 151, 152, 153 are electrically connected and is configured by a selectable frequency control signal 170. However, in some implementations, quartz crystals 151, 152, 153 are all electrically connected and thus the switching matrix 154 is not necessary. In such an implementation, the radio controlled clock will be used in locations where only one broadcast time code signal 141 is present, and thus, a valid time code signal 155 will be generated by only one of the quartz crystals 151, 152, 153. Similar to the conventional single channel radio controlled clock, the time code signal 155 is received by a radio receiver/time code decoder 160 to produce a time setting and/or correction signal 161. In addition to the multiple quartz crystals used in the quartz crystal matrix, the conventional multi-channel radio controlled clock might also have an additional quartz crystal to generate a real-time signal 21 as shown in FIG. 1.

Quartz crystals are used in conventional radio time clocks because they have very high frequency stability. The use of quartz crystals to generate a real-time signal leads to timepieces which keep very accurate time. The inherent stability of quartz crystals also increases the likelihood of accurate demodulation of a broadcast time code signal, since, the carrier of the broadcast time code signal is locked to that of a very stable cesium oscillator. However, the inclusion of multiple quartz crystals significantly increases the cost and size of such radio controlled clocks. A conventional quartz crystal radio controlled clock may contain up to N+1 quartz crystals, where N is the number of radio frequencies that the quartz crystal radio controlled clock is configured to receive. For example, a radio controlled clock which is marketed for use in the United States, Japan, and Germany may contain up to four quartz crystals. In addition to the increased product cost, there are engineering and manufacturing difficulties as well: multiple quartz crystals need to fit within the device. Thus, using multiple quartz crystals in a radio controlled clock may be disadvantageous because of increased material costs and engineering challenges.

Therefore, a need exists for a radio controlled clock that can receive radio signals at any of a plurality of frequencies but which enables the use of a single quartz crystal.

SUMMARY OF THE INVENTION

Embodiments of the present invention relate to apparatuses, circuits, and methods for receiving at least one radio signal in a radio controlled clock using a single reference timing source.

In one aspect, the invention concerns a radio controlled timing apparatus that can include: a radio receiver configured to (i) receive a local carrier signal derived from a reference timing signal and at least one modulated time code signal and (ii) generate a time code signal from the local carrier signal and at least one modulated time code signal; a decoder configured to (i) receive the time code signal and (ii) generate a time setting and/or correction signal therefrom; and a timing mechanism configured to receive (i) a real-time signal derived from the reference timing signal and (ii) the time setting and/or correction signal.

In another aspect, the invention concerns a circuit for a radio controlled timing apparatus that can include: a reference timing signal source; a frequency synthesizer configured to (i) receive a reference timing signal and a selectable frequency control signal and (ii) generate a local carrier signal from the reference timing signal and the selectable frequency control signal;

a radio receiver configured to (i) receive the local carrier signal and at least one modulated time code signal and (ii) generate a time code signal from the local carrier signal and at least one modulated time code signal; and a decoder configured to (i) receive the time code signal and (ii) generate a time setting and/or correction signal therefrom.

In yet another aspect, the invention concerns a circuit for a radio controlled timing apparatus that can include: a frequency synthesizer configured to (i) receive a reference timing signal and a selectable frequency control signal and (ii) generate a local carrier signal from the reference timing signal and the selectable frequency control signal; and a radio receiver configured to (i) receive the local carrier signal and at least one modulated time code signal and (ii) generate a time code signal from the local carrier signal and at least one modulated time code signal.

In a further aspect, the invention concerns a method of synchronizing a radio controlled timing apparatus that can include: multiplying and/or dividing a reference timing signal by a first ratio to generate a real-time signal; multiplying and/or dividing the reference timing signal by a second ratio to generate a local carrier signal; generating a time code signal from the local carrier signal and at least one modulated time code signal; and decoding the time code signal to generate a time setting and/or correction signal.

The present invention advantageously provides an economical approach to receiving at least one radio signal in a radio controlled clock using a single reference timing source. Further, the present invention advantageously provides a novel implementation of a radio controlled clock which is capable of receiving time code signals broadcast on a plurality of frequencies. These and other advantages of the present invention will become readily apparent from the detailed description of preferred embodiments below.

DETAILED DESCRIPTION OF THE PREFERRED EMBODIMENTS

Figure 1:
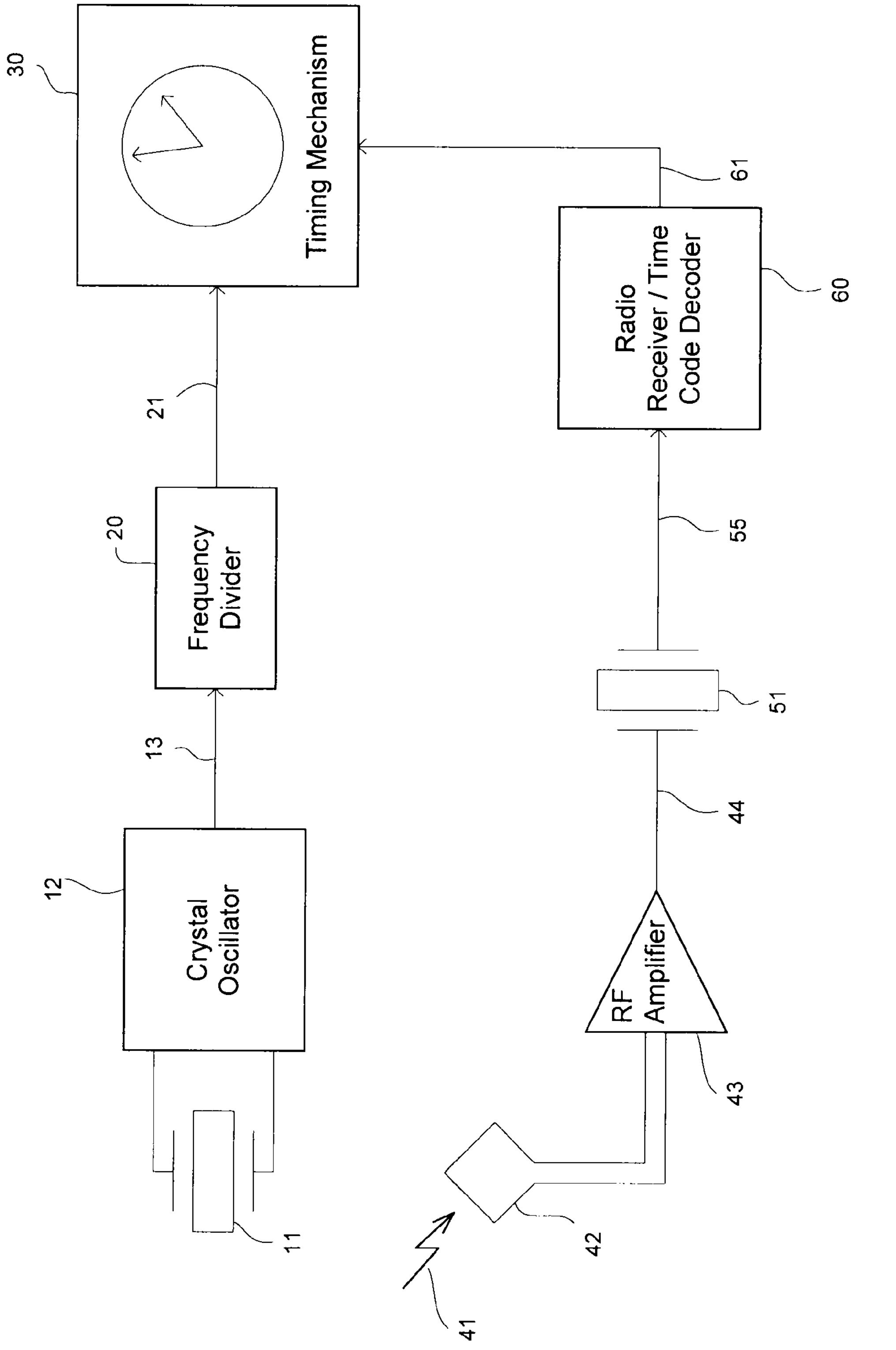
FIG. 1 is a diagram showing a conventional single-channel radio controlled clock which uses one quartz crystal for demodulating a modulated time code signal.
Figure 2:
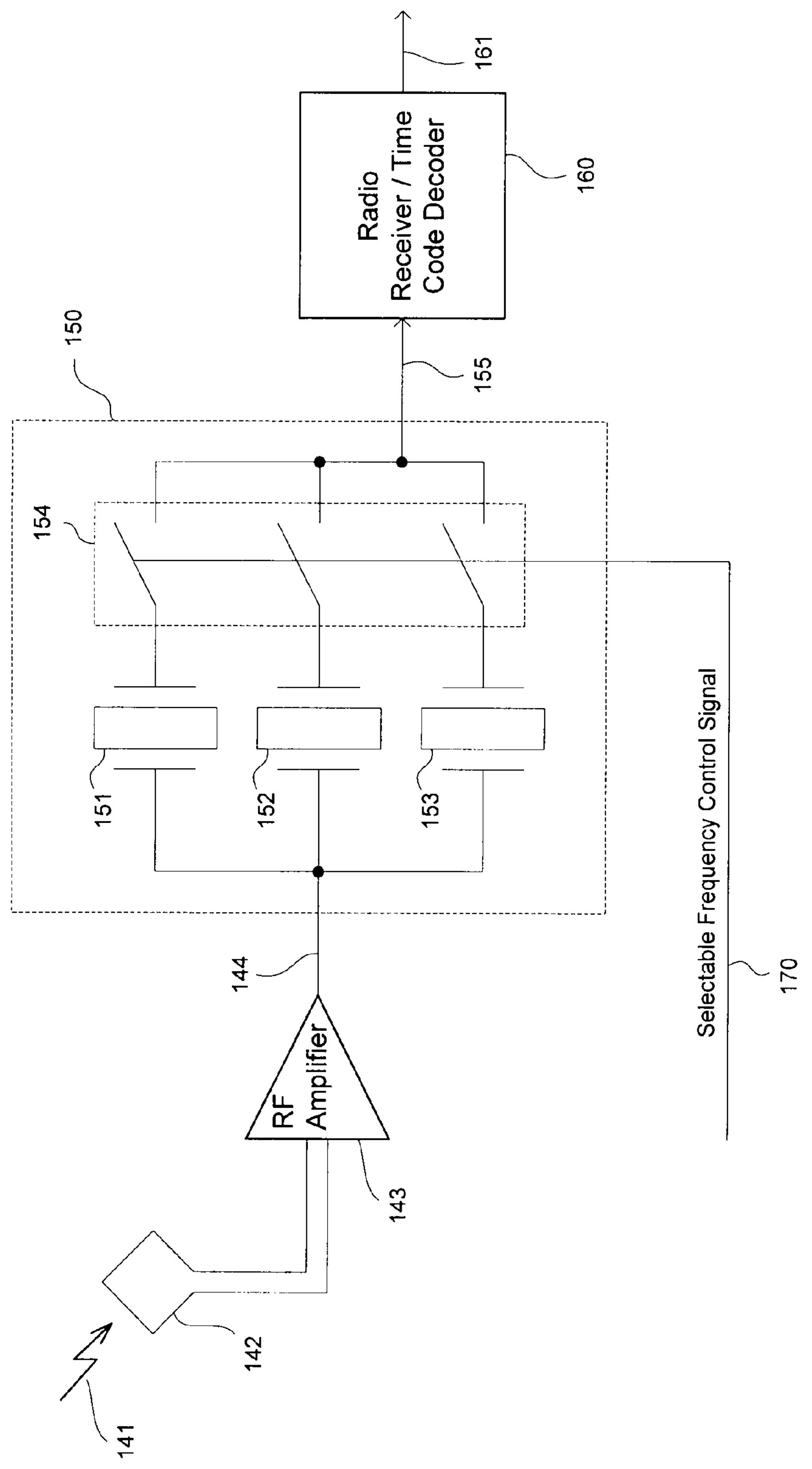
FIG. 2 is a diagram showing a portion of a conventional multiple-channel radio controlled clock wherein the single quartz crystal of FIG. 1 has been replaced by multiple quartz crystals to demodulate a modulated time code signal.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For convenience and simplicity, the terms "data," "signal," and "signals" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings. Also, for convenience and simplicity, the terms "computing," "calculating," "determining," "processing," "manipulating," "transforming," "operating," "displaying," and "setting" (or the like) may be used interchangeably, and generally refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

The present invention concerns apparatuses, circuits, and methods for receiving at least one radio signal in a radio controlled timing apparatus with a single clock source. In one aspect of the invention, the radio controlled timing apparatus can include: a radio receiver configured to (i) receive a local carrier signal derived from a reference timing signal and at least one modulated time code signal and (ii) generate a time code signal from the local carrier signal and at least one modulated time code signal; a decoder configured to (i) receive the time code signal and (ii) generate a time setting and/or correction signal therefrom; and a timing mechanism configured to receive (i) a real-time signal derived from the reference timing signal and (ii) the time setting and/or correction signal.

A further aspect of the invention concerns a circuit for a radio controlled timing apparatus that can include: a reference timing signal source; a frequency synthesizer configured to (i) receive a reference timing signal and a selectable frequency control signal and (ii) generate a local carrier signal from the reference timing signal and the selectable frequency control signal; a radio receiver configured to (i) receive the local carrier signal and at least one modulated time code signal and (ii) generate a time code signal from the local carrier signal and at least one modulated time code signal; and a decoder configured to (i) receive the time code signal and (ii) generate a time setting and/or correction signal therefrom.

A further aspect of the invention concerns a circuit for a radio controlled timing apparatus that can include: a frequency synthesizer configured to (i) receive a reference timing signal and a selectable frequency control signal and (ii) generate a local carrier signal from the reference timing signal and the selectable frequency control signal; and a radio receiver configured to (i) receive the local carrier signal and at least one modulated time code signal and (ii) generate a time code signal from the local carrier signal and at least one modulated time code signal.

A further aspect of the present invention concerns a method of synchronizing a radio controlled timing apparatus that can include: multiplying and/or dividing a reference timing signal by a first ratio to generate a real-time signal; multiplying and/or dividing the reference timing signal by a second ratio to generate a local carrier signal; generating a time code signal from the local carrier signal and at least one modulated time code signal; and decoding the time code signal to generate a time setting and/or correction signal.

The invention, in its various aspects, will be explained in greater detail below with regard to exemplary embodiments.

An Exemplary Radio Controlled Timing Apparatus

In one embodiment, an exemplary radio controlled timing apparatus includes: a radio receiver configured to (i) receive a local carrier signal derived from a reference timing signal and at least one modulated time code signal and (ii) generate a time code signal from the local carrier signal and at least one modulated time code signal; a decoder configured to (i) receive the time code signal and (ii) generate a time setting and/or correction signal therefrom; and a timing mechanism configured to receive (i) a real-time signal derived from the reference timing signal and (ii) the time setting and/or correction signal.

Figure 3:
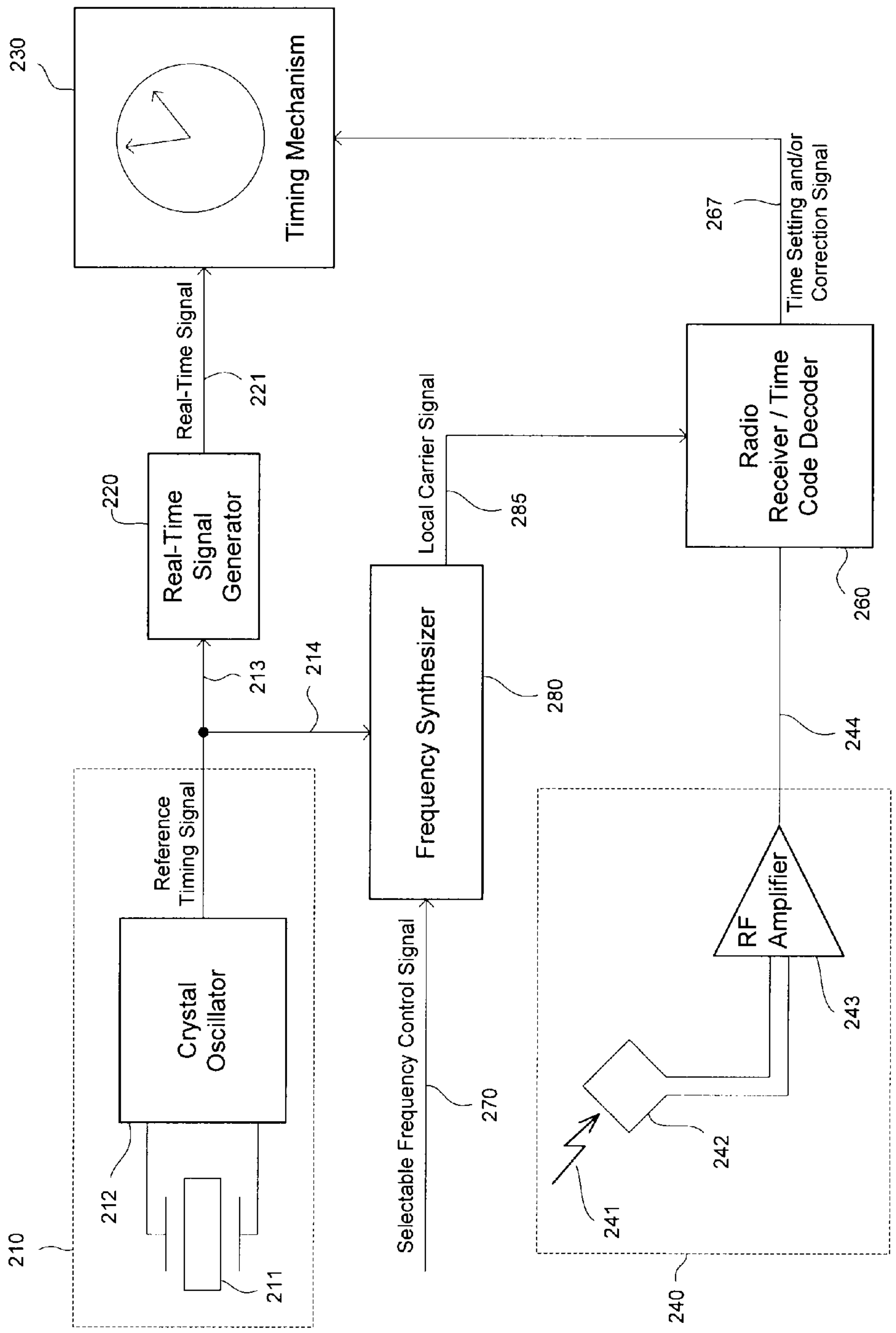
FIG. 3 is a diagram showing a multiple-channel radio controlled clock of the present invention.

Referring now to FIG. 3, a reference timing signal source 210 generates a reference timing signal 213, 214. For the purposes of this discussion, reference timing signal 213 and reference timing signal 214 are typically the same signal. However, either or both of the reference timing signals may be adjusted, modified, or otherwise differently processed with respect to the other (e.g., delayed, inverted, divided, and/or multiplied). A real-time signal 221 is derived from the reference timing signal 213. A local carrier signal 285 is derived from the reference timing signal 214. A radio receiver/time code decoder 260 receives a modulated time code signal 244 and the local carrier signal 285, and generates a time setting and/or correction signal 267 generally in response thereto. The time setting and/or correction signal 267 and the real-time signal 221 are received by the timing mechanism 230. Generally, the real-time signal 221 and the time setting and/or correction signal 267 are synchronized by conventional logic within the timing mechanism 230. However, such synchronization may occur outside of the timing mechanism 230 by using other conventional digital or analog methods that are well known to those skilled in the art.

In one implementation, the radio controlled timing apparatus may include a real-time signal generator 220 which receives the reference timing signal 213 and generates the real-time signal 221. The real-time signal generator 220 may include one or more multipliers and/or dividers, and the configuration of such real-time signal generators are well known to those skilled in the art.

In a further implementation, the radio controlled timing apparatus may include a frequency synthesizer 280 configured to receive the reference timing signal 214 and generate a local carrier signal 285. The frequency synthesizer 280 may include an integer or fractional-N (or "fractal-N", as it is sometimes known) type phase locked loop and at least one divider. Frequency synthesizers comprising such a phase locked loop and a frequency divider are conventional, and their design, implementation, and operation are well known to those skilled in the art. An example of a frequency synthesizer comprising an integer type phase locked loop and a frequency divider is shown in FIG. 4.

Figure 4:
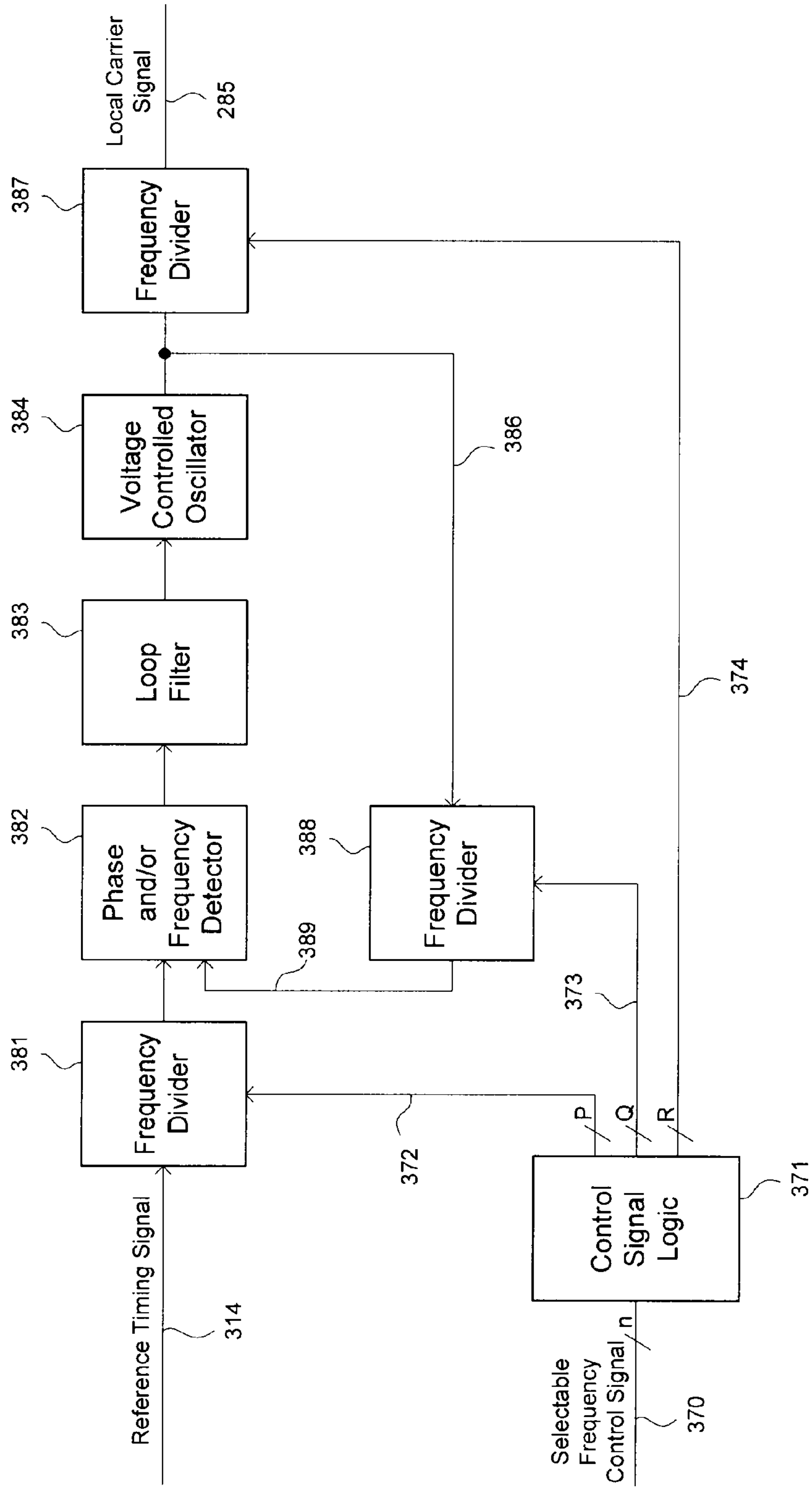
FIG. 4 is a diagram showing an implementation of a frequency synthesizer according to the present invention.

Referring to FIG. 4, a reference timing signal 314 is divided by a first frequency divider 381. A phase and/or frequency detector 382 receives both the divided reference timing signal from a frequency divider 381 and a feedback signal 389. The phase and/or frequency detector 382 is coupled to a loop filter 383 which is further coupled to a voltage controlled oscillator 384. The phase and/or frequency detector 382, loop filter 383, and voltage controlled oscillator 384 are conventional, and their design, implementation, and operation are well known to those skilled in the art. For example, phase and/or frequency detector 382 may comprise a conventional Type I Phase Detector which responds to the phase difference between two input signals. In the simplest form, the Type I Phase Detector may function as a digital "exclusive-or" gate. Alternatively, the phase and/or frequency detector 382 may comprise a conventional Type II Phase-Frequency detector which responds to the timing difference between transition edges (i.e., rising edge or falling edge) of two input signals. The voltage controlled oscillator 384 is coupled to a frequency divider 387 to generate the local carrier signal 285. Additionally, the voltage controlled oscillator 384 is coupled to a frequency divider 388 which generates a phase locked loop feedback signal 389. The feedback signal 389 of the phase locked loop is received by the phase and/or frequency detector 382.

The divider ratios within the frequency dividers 381, 387, 388 are controlled by the status of a selectable frequency control signal 370. The selectable frequency control signal 370 may be a digital multi-bit signal of n bits, where $2^n$ is the number of configurable states of the frequency synthesizer (e.g., the number of possible local carrier frequencies to be produced). The number of configurable states of the frequency synthesizer may directly relate to the number of broadcast time code signal frequencies that the radio controlled timing apparatus is configured to receive. The selectable frequency control signal 370 is decoded by control signal logic 371 to produce control signals P 372, Q 373, and R 374 which determine the divider ratios of the respective frequency dividers 381, 387, 388. Each control signal P, Q, or R may also be a digital multi-bit signal. For example, if the frequency divider 381 requires 8 configurable states, P may be a three-bit signal. The exemplary frequency synthesizer is thus programmable and can generate one or more local carrier signals with the same or different frequencies. Also, a single local carrier signal (e.g., 285) can have one of a plurality of frequencies.

In one implementation, and referring back to FIG. 3, each state of the selectable frequency control signal 270 may correlate to a particular broadcast radio time signal to be received [e.g., WWVB (broadcasting at 60 kHz) correlates to state one of the selectable frequency control signal, DCF77 (broadcasting at 77.5 kHz) correlates to state two of the selectable frequency control signal, JJY (broadcasting at 40 kHz) correlates to state three of the selectable frequency control signal, JJY (broadcasting at 60 kHz) correlates to state one or state four of the selectable frequency control signal, and MSF (broadcasting at 60 kHz) correlates to state one or five of the selectable frequency control signal.] In another implementation, each state of the selectable frequency control signal 270 may correlate to differential values for the purpose of frequency scanning (e.g., "up 17.5 kHz" correlates to state one of the selectable frequency control signal, "down 17.5 kHz" correlates to state two of the selectable frequency control signal; "down 20 kHz" correlates to state three of the selectable frequency control signal, and "up 20 kHz" correlates to state four of the selectable frequency control signal). The selectable frequency control signal 270 may be configured by a simple user interface device, such as an external switch or button. Alternatively, the selectable frequency control signal 270 may be configured within the radio controlled timing apparatus. In one implementation, the selectable frequency control signal 270 can be derived by the radio receiver/time code decoder 260. For example, the radio receiver/time code decoder 260 may contain logic which determines the presence of a valid broadcast time code signal 241. The radio receiver/time code decoder 260 may further contain logic which may be configured to sequentially select each state of the selectable frequency control signal 270 until a valid broadcast time code signal 241 is present.

Furthermore, the implementation and configuration of frequency dividers 381, 387, 388 as shown in FIG. 4 generally depends on the frequency of both the reference timing signal 314 and the local carrier signal 285 to be generated. For example, consider a radio controlled timing apparatus configured to receive a broadcast radio time signal on the United State's WWVB which broadcasts at 60 kHz. If the radio controlled timing apparatus has a direct conversion receiver, a local carrier signal 285 with a frequency of 60 kHz should be generated. Also, consider the same radio controlled timing apparatus where the reference timing signal 314 has a frequency of 32768 Hz. In one exemplary implementation, frequency divider 381 may be configured with a ratio of 1024, frequency divider 387 may be configured with a ratio of 3, and frequency divider 388 may be configured with a ratio of 5625. The phase and/or frequency detector 382 therefore will compare the reference timing signal 314 (frequency of 32768 Hz) divided by 1024 and the voltage controlled oscillator output signal 386 (frequency of 180 kHz) divided by 5625. As is shown, the phase and/or frequency detector 382 should be capable of operating at frequencies below 3 kHz (e.g., the comparison frequency is 32 Hz in the above example). However, where the frequency synthesizer comprises a fractional-N type phase locked loop, the comparison frequency could be equal to the frequency of the reference timing signal 314 (and thus, frequency divider 381 may be omitted).

In yet another implementation, the radio controlled timing apparatus as shown in FIG. 3 may include at least one antenna 242 and/or at least one RF amplifier 243 to receive and/or amplify at least one broadcast time code signal 241. Although the broadcast time code signals are generally in the low frequency spectrum (between 30 kHz to 300 kHz), typically, broadcast time code signals have frequencies of: 40 kHz (for transmissions from Japan); 50 kHz (for transmissions in eastern Russia); 60 kHz (for transmissions from both the United States and Japan); 68.5 kHz (for transmissions from China); 75 kHz (for transmissions from Switzerland); and 77.5 kHz (for transmissions from Germany). In a typical implementation, the low frequency broadcast time code signal 241 is received by the antenna 242 and amplified by the RF amplifier 243. The output of the RF amplifier 243 is a modulated time code signal 244.

Figure 5:
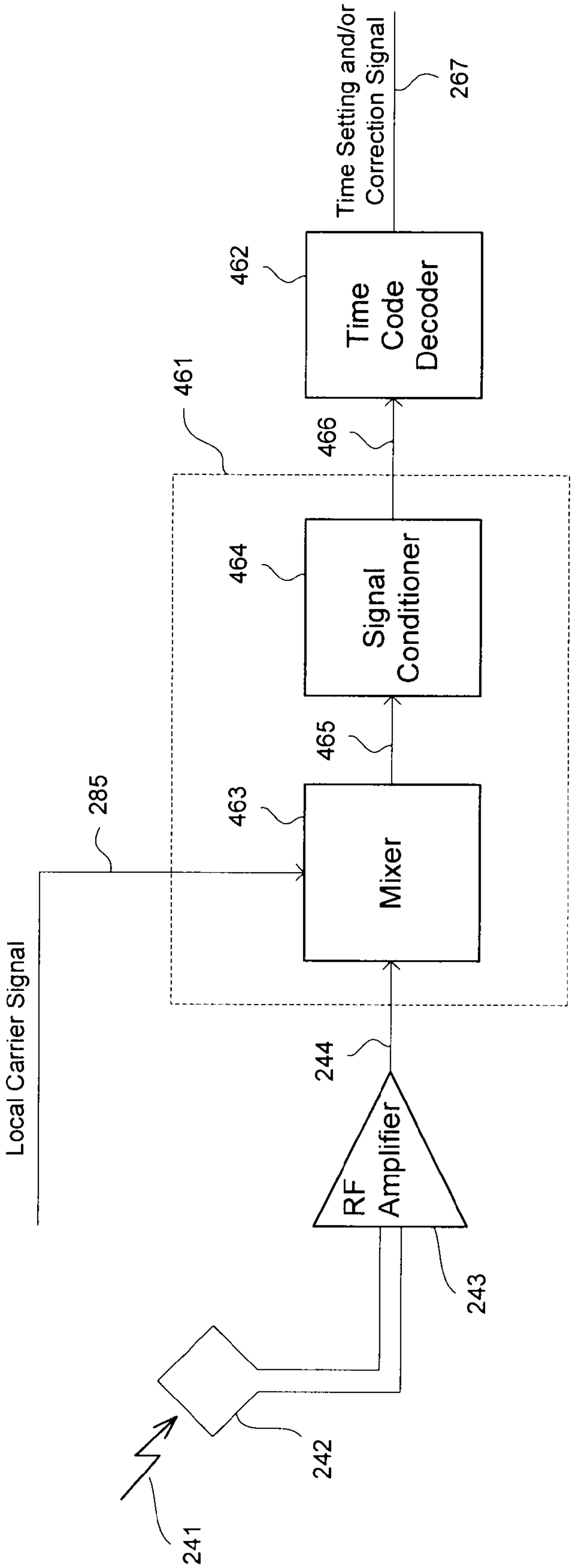
FIG. 5 is a diagram showing an implementation of a radio receiver/time code decoder according to the present invention.

The radio receiver/time code decoder 260 may consist of separate functional elements. As shown in FIG. 5, the local carrier signal 285 and the modulated time code signal 244 are inputs to the radio receiver 461. The radio receiver 461 may consist of a mixer 463 and a signal conditioner 464. The output of the radio receiver 461 is a time code signal 466 which is received by a time code decoder 462. Typically, the time code signal 466 contains at least the current time, however the time code signal 466 may also contain: the date; daylight savings time and leap year indicators; parity information; and/or other information. In one implementation, the time code decoder 462 is contained within a microprocessor. In an alternative implementation, the time code decoder 462 is contained within a logic array element (such as a programmable logic device or field programmable gate array) or an application specific integrated circuit. The time code decoder 462 generates the time setting and/or correction signal 267. As discussed above and as shown in FIG. 3, the time setting and/or correction signal 267 and the real-time signal 221 may be synchronized within the timing mechanism 230.

An Exemplary Circuit for a Radio Controlled Timing Apparatus

In another embodiment, a circuit for a radio controlled timing apparatus can include: a reference timing signal source; a frequency synthesizer configured to (i) receive a reference timing signal and a selectable frequency control signal and (ii) generate a local carrier signal from the reference timing signal and the selectable frequency control signal; a radio receiver configured to (i) receive the local carrier signal and at least one modulated time code signal and (ii) generate a time code signal from the local carrier signal and at least one modulated time code signal; and a decoder configured to (i) receive the time code signal and (ii) generate a time setting and/or correction signal therefrom.

Referring now to FIG. 3, a reference timing signal source 210 generates a reference timing signal 213, 214. In one implementation, the reference timing signal source 210 may include a quartz crystal 211 and an oscillator circuit 212. The quartz crystal 211 may further have a resonance frequency of about $2^X$ Hz, where X may be an integer of from 10 to 20 (e.g., $14 \leqq X \leqq 18$). In one implementation, the crystal has a frequency of about 32768 Hz (i.e., X equals 15). Reference timing signal 213 and reference timing signal 214 may be the same or different, as discussed above. A frequency synthesizer 280 receives the reference timing signal 214 and a selectable frequency control signal 270 and generates a local carrier signal 285. A radio receiver/time code decoder 260 receives the local carrier signal 285 and a modulated time code signal 244 and generates a time setting and/or correction signal. The radio receiver/time code decoder 260 may include of separate elements as described above and shown in FIG. 5: a radio receiver 461 and a time code decoder 462.

In yet another implementation, and as shown in FIG. 3, the radio controlled timing apparatus may include at least one antenna 242 and/or at least one RF amplifier 243 to receive and/or amplify at least one broadcast time code signal 241. Although the broadcast signals are generally in the low frequency spectrum (between 30 kHz to 300 kHz), typically, broadcast time code signals have frequencies of: 40 kHz (for transmissions from Japan); 50 kHz (for transmissions from eastern Russia); 60 kHz (for transmissions from both the United States and Japan); 68.5 kHz (for transmissions from China); 75 kHz (for transmissions from Switzerland); and 77.5 kHz (for transmissions from Germany). In a typical implementation, the low frequency broadcast time code signal 241 is received by the antenna 242 and amplified by the RF amplifier 243 as described above.

In a further implementation, and referring back now to FIG. 5, the radio receiver 461 may be of the direct conversion type. When a broadcast carrier signal modulated with a baseband signal is mixed with a local carrier signal whose frequency is equal to the broadcast carrier signal, as in the case of direct conversion radio receivers, the signal that results is the modulating baseband signal. Thus, where the radio receiver 461 is of the direct conversion type, the local carrier signal 285 will have a frequency equal to that of the desired broadcast time code signal 241. For example, a circuit for a radio controlled timing apparatus which contains a direct conversion radio receiver generates a local carrier frequency of 77.5 kHz to receive the German broadcast time code signal. In an alternative implementation, and for improved receiver selectivity, the radio receiver 461 may be of the super-heterodyne type. Super-heterodyne radio receivers combine a broadcast carrier signal modulated with a baseband signal and a local carrier signal whose frequency is equal to the broadcast carrier signal plus or minus a fixed offset (i.e. the intermediate frequency). Generally, the intermediate frequency is less than the local carrier frequency. The output of the mixer is then filtered to remove the undesired modulation products. The resulting signal is the modulating baseband signal. Thus, where the radio receiver 461 is of the super-heterodyne type, the local carrier signal 285 will have a frequency equal to that of the desired broadcast time code signal 241 plus the fixed intermediate frequency. For example, a circuit for a radio controlled timing apparatus which contains a super-heterodyne receiver with an intermediate frequency of 4.5 kHz generates a local carrier frequency of 82 kHz to receive the German broadcast time code signal (77.5 kHz plus 4.5 kHz).

In another implementation, the radio controlled timing apparatus may include a real-time signal generator. Referring back to FIG. 3, the real-time signal generator 220 receives the reference timing signal 213 and generates the real-time signal 221. The real-time signal generator 220 may include of one or more multipliers and/or dividers, and the configuration of such real-time signal generators are well known to those skilled in the art. Where the reference timing signal source 210 comprises or consists of a quartz crystal 211 with a resonance frequency of 32768 Hz, the real-time signal generator 220 may comprise or consist of a binary divider. Typically, the real-time signal 221 is used to drive the timing mechanism and has a frequency of one pulse per second.

In a further implementation, the frequency synthesizer 280 may include an integer or fractional-N type phase locked loop and at least one divider. Frequency synthesizers comprising such a phase locked loop and frequency divider are conventional, and their design, implementation, and operation are well known to those skilled in the art. An example of a frequency synthesizer comprising an integer type phase locked loop and a frequency divider is shown in FIG. 4 and is discussed above.

Another Exemplary Circuit for a Radio Controlled Timing Apparatus

In yet another embodiment, a circuit for a radio controlled timing apparatus that can include: a frequency synthesizer configured to (i) receive a reference timing signal and a selectable frequency control signal and (ii) generate a local carrier signal from the reference timing signal and the selectable frequency control signal; and a radio receiver configured to (i) receive the local carrier signal and at least one modulated time code signal and (ii) generate a time code signal from the local carrier signal and at least one modulated time code signal.

Referring now to FIG. 3, a frequency synthesizer 280 receives a reference timing signal 214 and a selectable frequency control signal 270 and generates a local carrier signal 285. The local carrier signal 285 and the modulated time code signal 244, may be received by a radio receiver (such as receiver 461 as shown in FIG. 5), which may include of a mixer 463 and a signal conditioner 464, and which may generate the time code signal 466. In one implementation, the circuit contains a time code decoder 462 which receives the time code signal and generates a time setting and/or correction signal 267.

In another implementation, the circuit may include at least one RF amplifier to amplify at least one broadcast time code signal. As discussed above and shown in FIG. 5, an RF amplifier 243 may be coupled to an antenna 241 and a radio receiver 461 for the purposes of amplifying a broadcast time code signal 241. The RF amplifier 243 outputs a modulated time code signal 244.

In yet another implementation, the circuit may include a reference timing signal source. As shown in FIG. 3, the reference timing signal source 210 may be coupled both to the frequency synthesizer 280 and to the real-time signal generator 220, and provide a reference timing signal 213, 214 thereto. In a further implementation, reference timing signal source 210 may be a crystal oscillator.

An Exemplary Method of Synchronizing a Radio Controlled Timing Apparatus

In a further embodiment, a method of synchronizing a radio controlled timing apparatus can include: multiplying and/or dividing a reference timing signal by a first ratio to generate a real-time signal; multiplying and/or dividing the reference timing signal by a second ratio to generate a local carrier signal; generating a time code signal from the local carrier signal and at least one modulated time code signal; and decoding the time code signal to generate a time setting and/or correction signal. Typically, the time code signal contains at least the current time, however the time code signal may also contain: the date; daylight savings time and leap year indicators; parity information; and/or other information.

In one implementation, the method of generating a time code signal may include: receiving a modulated time code signal; and, demodulating the modulated time code signal with the local carrier. In another implementation, the method may also include adjusting the real-time signal in accordance with the time setting and/or correction signal so as to synchronize the radio controlled timing apparatus with a broadcast time code signal.

In yet another implementation, the method may also include displaying a representation of the real-time signal. The representation may be displayed in a traditional analog form (movable time hands) or in a digital display element, such as a liquid crystal display (LCD).

The frequency of the generated local carrier signal may correspond to the state of a selectable frequency control signal. The state of the selectable frequency control signal may be selected by a simple user interface, such as an external switch or button. Alternatively, the selectable frequency control signal may be configured within the radio controlled timing apparatus by a logic element. One method of configuring the selectable frequency control signal within the logic element may include the steps of: selecting a first state of the selectable frequency control signal corresponding to a first desired broadcast radio station; determining whether a valid time code signal was received; and if a valid time code signal was not received, selecting a second state of the selectable frequency control signal which corresponds to a second desired broadcast radio station and likewise determining whether a valid time code signal was received. The process may repeat, sequentially, selecting each state of the selectable frequency control signal corresponding to each broadcast radio station that to be received.

CONCLUSION/SUMMARY

Thus, the present invention provides apparatuses, circuits, and methods which can enable a radio controlled clock to receive radio signals at any of a plurality of frequencies using a single quartz crystal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multi-region, radio controlled timing apparatus for receiving, and responding to, a different broadcast time-code signal in each of multiple regions, each of said different broadcast time-code signals being transmitted at a different carrier-transmission frequency, said multi-region, radio controlled timing apparatus comprising:

a local reference oscillating signal source for generating a local reference timing signal at a first frequency;

a real-time signal generator responsive to said local reference timing signal, said real-time signal generator producing a local-time-tracking signal from said local reference timing signal;

a frequency synthesizer responsive to said local reference timing signal and having a frequency-select input, said frequency synthesizer converting said local reference timing signal into a local-carrier signal having a frequency determined in accordance with said frequency-select input;

a radio receiver coupled to said frequency synthesizer, said radio receiver receiving any of said different broadcast time-code signals and demodulating the received broadcast time-code signal by use of said local-carrier signal to recover a master-time signal; and a timing mechanism coupled to said real-time signal generator and to said radio receiver, said timing mechanism tracking the passage of time as determined from said local-time-tracking signal and adjusting its currently tracked time in accordance with said master-time signal;

wherein said frequency synthesizer includes a phase locked loop (PLL) and a frequency-select control logic circuit;

said PLL having a phase and/or frequency detector and a voltage controlled oscillator (VCO), said phase and/or frequency detector having a signal-in input node responsive to said local reference timing signal and a feedback input node, said VCO producing an oscillating output in response to said phase and/or frequency detector, said oscillating output being coupled to said feedback input node;

said frequency-select control logic circuit having an input for receiving said frequency-select input, and at least a first frequency-change output for adjusting a frequency of a signal at one of said signal-in input node and said feedback input node;

wherein said frequency-select control logic circuit further has a second frequency-change output, said frequency synthesizer further having:

a first adjustable frequency divider coupling said local reference timing signal to said signal-in input node, a first frequency divisor value of said first adjustable frequency divider being set by said first frequency-change output; and an second adjustable frequency divider coupling said oscillating output to said feedback input node, a second frequency divisor value of said second adjustable frequency divider being set by said second frequency-change output;

wherein said first and second frequency divisor values are chosen by said frequency-select control logic circuit to assign said local-carrier signal said target frequency.

2. The multi-region, radio controlled timing apparatus of claim 1, wherein said frequency synthesizer further includes third adjustable frequency divider coupled to receive said oscillating output and to produce said local-carrier signal, said frequency-select control logic circuit having a third frequency-change output, a third frequency divisor value of said third adjustable frequency divider being set by said second frequency-change output, wherein said local-carrier signal is assigned said target frequency further in response to said third frequency divisor value.

3. The circuit of claim 1, wherein said radio controlled timing apparatus is a timepiece.

4. The circuit of claim 3, wherein said timepiece is a watch.

5. The circuit of claim 3, wherein said timepiece is a clock.

6. The circuit of claim 3, wherein said timepiece has a time display including movable time hands.

7. The circuit of claim 3, wherein said time code signal is a data signal.

* * * * *